United States Patent [19]
Clark

[11] Patent Number: 4,744,398
[45] Date of Patent: May 17, 1988

[54] PROTECTIVE COVER FOR RECEIVER-SPEAKER

[76] Inventor: Larry E. Clark, 151 Cedar Pl., Huntington, W. Va. 25702

[21] Appl. No.: 867,041

[22] Filed: May 27, 1986

[51] Int. Cl.$^4$ .............................................. A45F 4/00
[52] U.S. Cl. .................................. 750/52 R; 224/153; 224/209; 455/100
[58] Field of Search ............... 224/209, 151, 153, 191, 224/259; 383/24, 11; 150/52 R; 455/351, 100; 381/169

[56] References Cited

U.S. PATENT DOCUMENTS

| | | | |
|---|---|---|---|
| 3,114,105 | 12/1963 | Neumiller | 455/351 X |
| 3,133,691 | 5/1964 | Corbett | 383/103 |
| 3,174,129 | 3/1965 | Laughlin | 381/169 X |
| 3,370,236 | 2/1968 | Walker | 455/351 X |
| 4,073,416 | 2/1978 | McComber | 455/351 X |
| 4,423,834 | 1/1984 | Rush | 224/151 |

Primary Examiner—Henry J. Recla
Assistant Examiner—David Voorhees
Attorney, Agent, or Firm—Richard C. Litman

[57] ABSTRACT

A protective container assembly for receiver-speaker equipment including an outer container generally rectangular in configuration and closed along three sides and having a mouth at an end thereof with one side of the mouth extending beyond it as a flap member, the outer container being adapted to be secured to straps of a life vest, an inner container generally rectangular in configuration and closed along three sides and having a mouth at an end thereof, an equipment cover generally elongate in configuration and closed along longitudinal sides thereof with a large portion at one end and having a mouth at an opening in the end at the large portion, and separate Velcro strip closure means disposed across interior surfaces of the mouths of each of the outer container, the inner container and the cover. The outer container is sized to store the inner container and the cover within it.

10 Claims, 2 Drawing Sheets

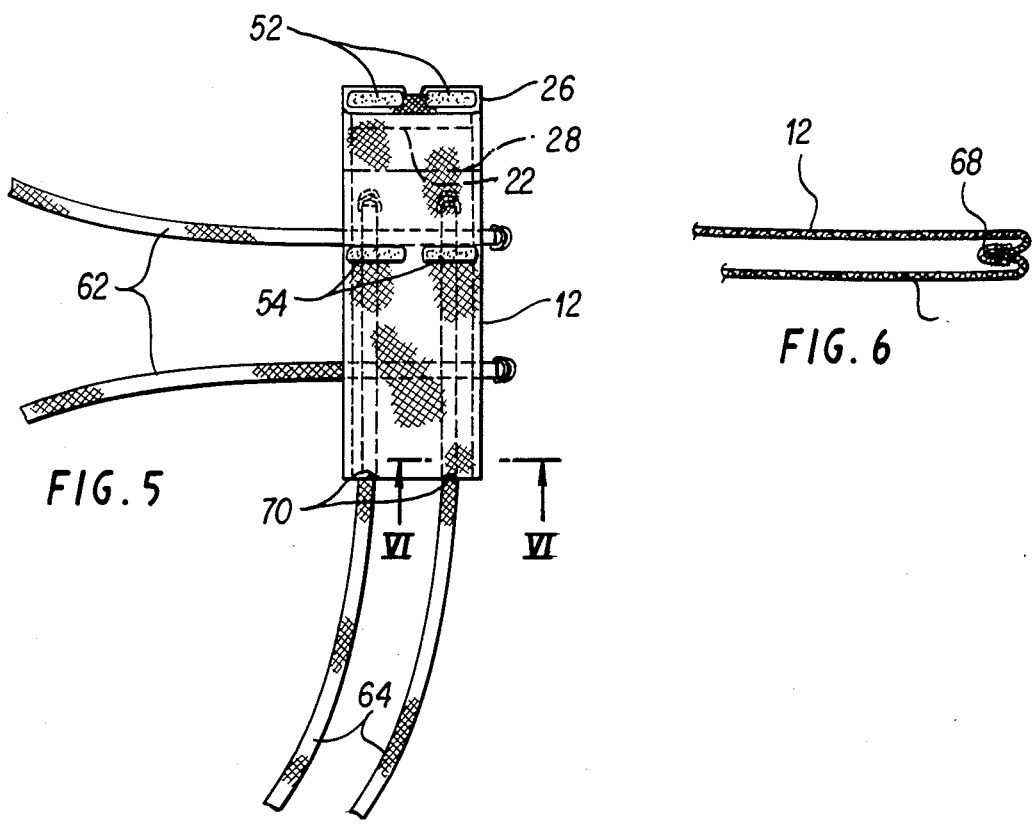
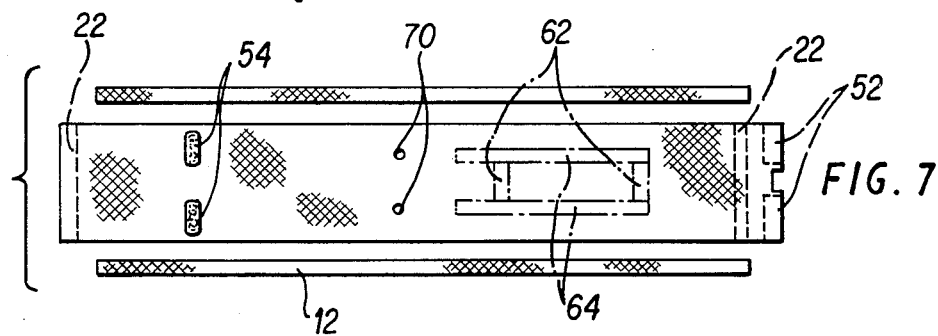
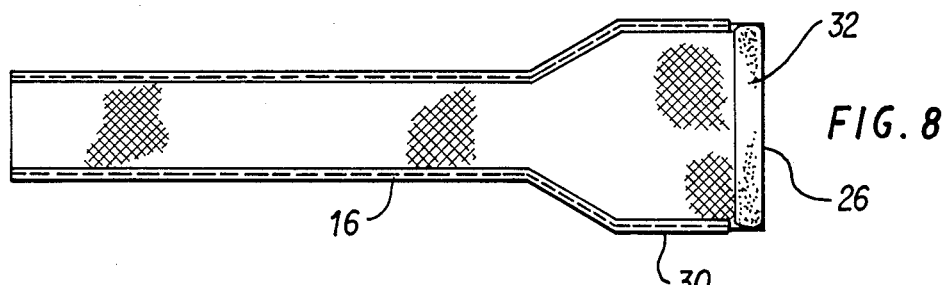
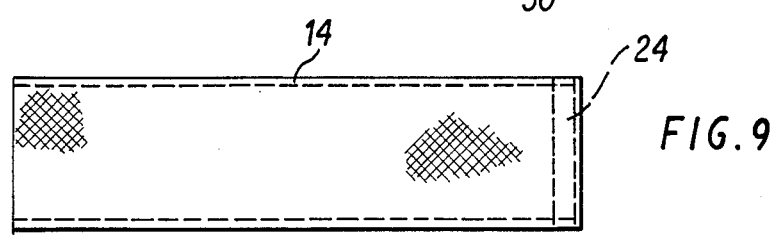

PROTECTIVE COVER FOR RECEIVER-SPEAKER

BACKGROUND OF THE INVENTION

1. Field of the Invention

The invention relates to an improved protective cover for receiver-speaker devices and method for its manufacture so radio receivers and microphones components may be used in generally adverse weather, and more particularly the invention is directed to providing a series of containers constructed of canvas, cloth, or plastic materials having a Velcro ® strip securing members extending across a mouth of each of the containers.

The invention relates further to providing a set of containers providing for encasing equipment that is generally known to become impaired by weather and in which the containers have a mouth or opening member across the interior lip of which are Velcro ® strip securing members for closing the container at that point. The invention also relates to the method of sewing, molding, constructing and otherwise manufacturing the protective covers of the invention as more particularly described herein.

The invention provides for a series of containers constructed of canvas, cloth, or plastic materials having a Velcro ® strip securing members extending across a mouth of each of the containers. The materials are of such as canvas for providing heavy duty protection under adverse weather conditions and encasing equipment within a water proofing environment. Velcro is used to close openings along interior portions of the openings immediate areas about the mouth of the opening. Reflective tape members may be provided to replace the ones covered over by use of the container when overlying the reflective tape members of a life vest or the like. A set of drain holes are provided along a bottom of an outer pouch or container for relieving by outflow of the immediate presence of water droplets in the container. The outer container may have straps to secure it to a life vest or life jacket or the like, and with these straps, the device may be worn as a "back pack" separately of the life vest.

Application of the device of the invention is in the commercial marine industry and environment, primarily in inland waterways on vessels and associated barges during loading and handling operations, as well as with Coast Guard duties of ship handling. Particularly, the implication of the invention has application to anyone wearing a commercial life vest and using a two-way portable radio with external speaker microphone.

Use of marine VHF portable, two way radio communications employs a frequency range of 156 to 162 MHz range for transmit and receive operations, as licensed under current Rules and Regulations Parts 81 and 83 (47 CFR 81 and 83).

2. Description of the Prior Art

Various prior art carriers, covers, jackets, and the like, of cloth or other such materials as well as related apparatus and method of their construction in general, are found to be known and exemplary of the U.S. prior art are the following:

| | |
|---|---|
| 1,198,602 | Sweeney |
| 2,070,818 | Winckler |
| 1,902,548 | Fenwick, Jr. |
| 2,163,501 | Speicher et al |
| 2,361,414 | Ramsey |

-continued

| | |
|---|---|
| 2,366,455 | Patten |
| 2,996,227 | Andrew |
| 3,226,740 | Senkewich |
| 3,314,464 | Veilleux |
| 3,482,748 | Roberts, Jr. |
| 3,798,692 | Madeley |
| 3,813,017 | Pimsleur |
| 4,347,956 | Berger |

Presently there are used belt type leather cases that are not found generally waterproof nor is there a cover for microphones and speakers protecting the sensitive part of the microphone and speaker from the presence of adverse weather conditions, particularly since it is found very difficult to provide equipment protection from rain and adverse weather elements.

These patents or known prior uses teach and disclose various types of carriers, covers, jackets, and the like, as well as related apparatus and method of their construction, but none of them whether taken singly or in combination disclose the specific details of the combination of the invention in such a way as to bear upon the claims of the present invention.

SUMMARY OF THE INVENTION

An object, advantage and feature of the invention is to provide a novel set of pouches or containers for protective covers, one of which is particularly for a receiver-speaker combination.

Another object of the invention is directed further to a container construction providing for the outward flow of resident water through a set of drain holes disposed along a bottom portion of the outer container should water cause to collect in the outer container. The outer container may carry an inner container and a cover for the microphone-speaker and control mechanism therefor. All of the containers are provided with a Velcro closure along a peripheral edge of the mouth or opening of the container.

Also an object of the invention is to provide a simple and direct method for the improved construction of a container closure that overcomes each and every objection above stated.

Another object of the invention is to provide a novel and improved attachment to life jackets or life vests by attachments by a set of four straps. The apparatus of the invention does not restrict movement of the wearer and it provides easy communications in bad weather, rain, snow and the like. Reflective materials are placed on the exposed portion of the outer pouch or container to replace ones covered on the life vest. Although the protective cover device of the present invention is not submersible, the drain holes on the bottom of the container force an air pocket to form at the top of the container. It does take several seconds for water to damage radio equipment so water found resident within the container tends to outflow the container through the drain holes when the container is upright and worn properly by the wearer. Should a wearer fall overboard and not remain under water for very long, the chances are very good the radio equipment may still operate properly.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF THE SEVERAL VIEWS OF THE DRAWING

FIG. 5 shows a plan view of a strap arrangement on an outer bag for attachment to a work vest.

FIG. 6 is a sectional view taken along line 6—6 of FIG. 5 showing a water resistant fabrication of the outer bag.

FIG. 7 is a plan view of a development of the outer bag and strips for water resistant seams.

FIG. 8 is a plan view of the microphone-speaker cover displayed in inside-out relation, and FIG. 9 is a plan view showing an enlarged view of the inner cover.

DESCRIPTION OF A PREFERRED EMBODIMENT OF THE INVENTION

Figure 1:
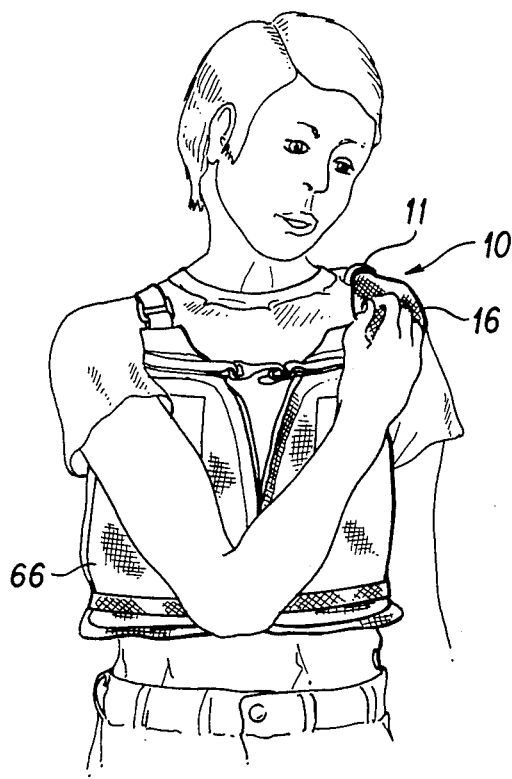
FIG. 1 shows how a protective cover for the receiver-speaker may be used in its protective cover and further illustrating a typical installation of the device according to a preferred embodiment and best mode of the present invention.
Figure 2:
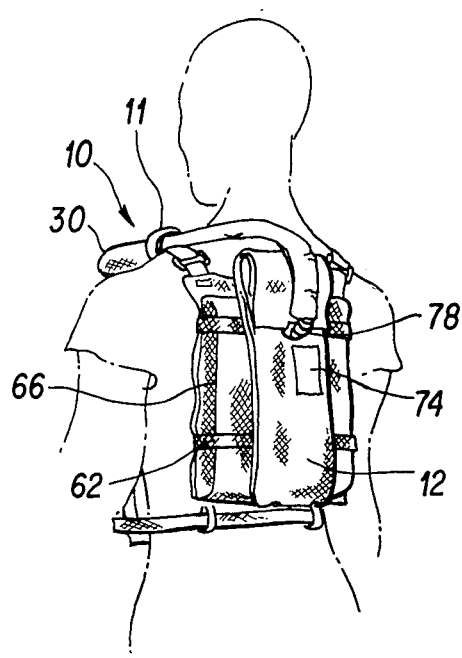
FIG. 2 shows how a radio in its protective cover attaches to a work vest and embodying the concepts of the invention.

Referring now to the drawings there is shown in the Figures a protective cover 10 for a receiver-speaker assembly constructed of a set of several pieces of flexible plastic material such as heavy duty canvas, plastic sheets or cloth and which form a longer outer pouch or container 12, a smaller inner pouch or container 14 and an equipment pouch or cover 16.

The outer and inner containers 12, 14 are generally rectangular in configuration being closed along three sides and have a mouth 22, 24 so located at the open end thereof. The outer container 12 has extending outwardly from one side of the mouth 22 a flap member 26 with a fold 28 disposed along a body portion of the container 12.

The equipment cover 16 is generally elongate in configuration and closed along longitudinal sides thereof with an enlarged portion at one end 30 and having a mouth 32 at the free end 30.

Across the interior surfaces of the mouths 22, 24, and 32 are a set of separate Velcro strip closure members 42, 44, and 46, each comprising separate male-female elements with set matingly engaging with the other of the set. Also a set of VELCRO strip closure members 52, 54 on the container 12 provide for closure of the flap member 26 along the fold 28 so the strip members 52, 54 matingly engage each other. The outer container 12 has its rear surface 56 securably attached to sets of straps 62, 64 (FIG. 5) that are attached to a life vest 66 and in absence to being secured to a life vest 66, may be used by a wearer as a back pack when worn independently of the life vest 66. In the latter instance, the strips 62,64 will be understood to serve as the means by which the outer container 12 is secured directly to the wearer.

Figure 3:
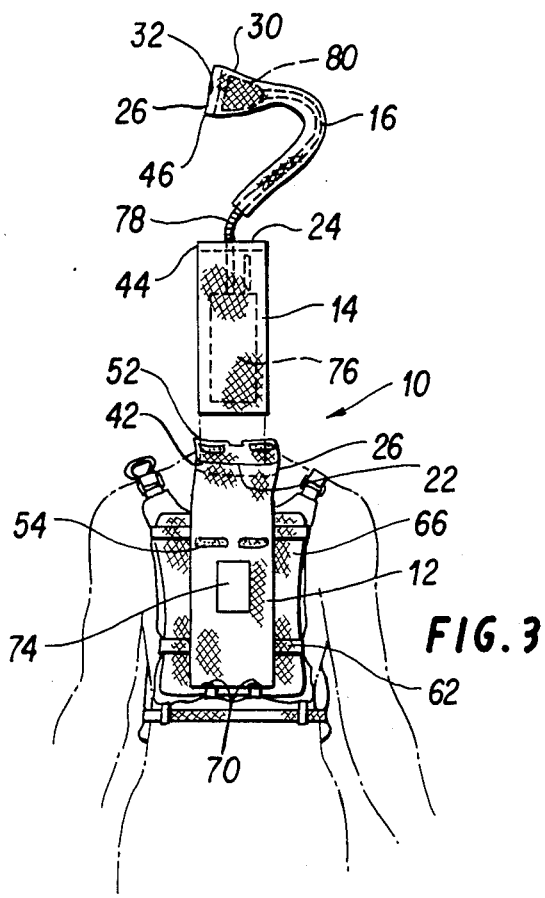
FIG. 3 shows how an inner bag fits inside a main protective bag.
Figure 4:
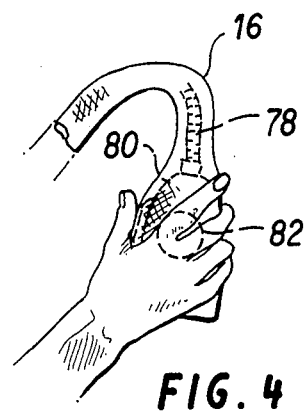
FIG. 4 shows how a transmitter button may be used through the cover.

FIGS. 3, 5, and 7 show the container 12 having a set of drain holes 70 for allowing drainage by gravity of collected water in the container 12 to pass through these holes 70.

The containers 12, 14, and cover 16 may be sewn, as shown by the stiches 68 in FIG. 6, or may be heat sealed in a seam (not shown) where the material is a plastic material described above. In such cases of forming the material the container is reversed by being turned inside out. Reflective material(s) 74 are provided to augment the life vest reflective straps 62, 64.

A radio transceiver 76 is communicatively connected by a cable 78 to a microphone-speaker 80 which is provided a button 82 to energize and deenergize activation of the transceiver 76 by compression of the button 82 through the thickness of the material of the cover and most enlarged portion - 16. A VELCRO ring 11 that opens and closes is used to secure cover 16 to life vest 66 or is similarly secured to a shoulder strap if used by a wearer as a back pack.

The purpose of the invention provides that anyone wearing a commercial life vest and needs use of a two way portable radio with external speaker and microphone should accomodate use of the device of the invention. Attachment to a life vest is by means of a set of the four straps and does not restrict use or movements of the wearer while continuously provides easy communications in all weather, bad weather, rain, snow, and the like. Although the device is not intended to provide extended protection if submerged, the drain holes 70 on the bottom of the container 12 force an air pocket to form at the top of the container. It would take several seconds for the water to damage the equipment. Should a wearer fall overboard he would have a good chance to make a transmission with radio transceiver 76.

The apparatus of the protective cover 10 for receiver-speaker equipment and the outer and inner containers 12, 14 of the invention may be so constructed and arranged in its component parts that it may be assembled as a kit or in kit form.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. A protective carrier assembly comprising, a large outer container of generally rectangular configuration and having a substantially closed bottom and closed sides, the top of said outer container provided with an opening, a flap adapted to enclose said opening, attachment means on said outer container for removably mounting said outer container to a user's body, a smaller inner container of generally rectangular configuration and having a closed bottom and closed sides, the top of said inner container provided with an opening, an elongated cover closed along its sides and having an open lower end and an enlarged opposite free end portion adapted to be closed, a radio transceiver within said smaller inner container and having a flexible cable provided with a free end extending from said radio transceiver through said inner container opening, said radio transceiver containing inner container fully insertable within said outer container with said cable projecting from said outer container opening, said cable including a speaker microphone at its free end and insertable within said cover with said speaker-microphone disposed within said cover enlarged free end portion whereby, said transceiver disposed within said smaller inner container and in turn disposped within said large container is protected from the weather while said speaker-microphone is similarly protected and readily displaceable to alternate portions of the user's body for manipulation of said speaker-microphone from outside said cover free end portion.

2. An assembly according to claim 1 wherein, said attachment means comprises a plurality of straps.

3. The apparatus of claim 1 wherein the material of the outer container, the inner container and the cover is of heavy duty canvas material.

4. The apparatus of claim 1 wherein the material of the outer container, the inner container and the cover is plastic.

5. The apparatus of claim 1 wherein the material of the outer container, the inner container and the cover is cloth.

6. The apparatus of claim 1 wherein a VELCRO strip closure means is disposed across an end of the flap and for engaging a mating VELCRO strip closure means on an adjacent portion of the outer container.

7. The apparatus of claim 1 wherein the outer container has a set of drain holes in a bottom thereof.

8. The apparatus of claim 1 wherein said container closed bottom and sides are formed by sewing.

9. The apparatus of claim 1 wherein said container closed bottom and sides are formed by sewing and then the structure of each said container is reversed by being turned inside out.

10. The apparatus of claim 1 wherein the any of the containers or cover include reflective material.

* * * * *